US012263381B2

(12) United States Patent
Truesdell et al.

(10) Patent No.: US 12,263,381 B2
(45) Date of Patent: Apr. 1, 2025

(54) CAM ASSEMBLY FOR USE WITH POLE CLIMBING FALL RESTRICTION DEVICE

(71) Applicant: Buckingham Manufacturing Company, Inc., Binghamton, NY (US)

(72) Inventors: Kevin W. Truesdell, Binghamton, NY (US); Timothy Batty, Binghamton, NY (US); James J. Rullo, Binghamton, NY (US); Deforest C. Canfield, Oxford, NY (US)

(73) Assignee: Buckingham Manufacturing Company, Inc., Binghamton, NY (US)

( * ) Notice: Subject to any disclaimer, the term of this patent is extended or adjusted under 35 U.S.C. 154(b) by 0 days.

(21) Appl. No.: 16/137,622

(22) Filed: Sep. 21, 2018

(65) Prior Publication Data

US 2019/0022465 A1 Jan. 24, 2019

Related U.S. Application Data

(63) Continuation of application No. 15/137,079, filed on Apr. 25, 2016, now Pat. No. 10,099,087.

(60) Provisional application No. 62/152,085, filed on Apr. 24, 2015.

(51) Int. Cl.
*A63B 27/00* (2006.01)
*A62B 35/00* (2006.01)
*A63B 29/00* (2006.01)

(52) U.S. Cl.
CPC .......... *A63B 27/00* (2013.01); *A62B 35/0075* (2013.01); *A63B 29/00* (2013.01)

(58) Field of Classification Search
CPC ......... A63B 27/00; A63B 27/02; A63B 27/04; A63B 69/0048; A63B 29/00; A63B 29/024; A62B 35/0075; A62B 35/0043; A62B 35/0081; A62B 35/0087; A62B 1/14; A44B 11/00; A44B 11/12; Y10T 24/4016
See application file for complete search history.

(56) References Cited

U.S. PATENT DOCUMENTS 318,053 A * 5/1885 Thurlow ................ A44B 11/12 24/170
2,998,626 A * 9/1961 Prete, Jr. ................ A44B 11/14 24/170
3,179,994 A * 4/1965 Meyer ...................... A62B 1/14 188/65.2
3,340,964 A * 9/1967 Glover ..................... B64D 1/00 188/65.4
3,348,632 A * 10/1967 Swager ................... E06C 7/187 182/36
3,492,702 A * 2/1970 Stafford ................ F16G 11/101 403/374.5
3,795,028 A * 3/1974 Weiss .................. A44C 5/2042 24/191

(Continued)

*Primary Examiner* — Daniel P Cahn
*Assistant Examiner* — Shiref M Mekhaeil
(74) *Attorney, Agent, or Firm* — Bond, Schoeneck & King, PLLC; Frederick J. M. Price

(57) ABSTRACT

In a pole climbing fall prevention assembly having a pole strap, lanyard, and cam assembly that permits adjustment of the pole strap, a lever is attached to the sidewall of a cam assembly to ease the task of a climber needing to adjust the pole strap. A second lever can be attached to the second sidewall of the cam assembly to provide easier access to the lever regardless of the orientation of the cam assembly relative to the climber.

17 Claims, 7 Drawing Sheets

(56) References Cited

U.S. PATENT DOCUMENTS 4,034,828 A * 7/1977 Rose ........................ A62B 1/14 182/5
4,059,871 A * 11/1977 Swager ................... E06C 7/186 182/8
4,077,094 A * 3/1978 Swager ................. F16G 11/101 182/5
4,113,298 A * 9/1978 Kopp ........................ B66C 1/48 294/104
4,174,119 A * 11/1979 Biles ......................... B60P 7/12 248/505
4,253,218 A * 3/1981 Gibbs ................... F16G 11/106 188/65.1
4,366,757 A * 1/1983 Funk ........................ B61D 7/18 414/388
4,542,884 A * 9/1985 Dodge, Jr. ............. A62B 35/04 188/65.1
4,546,851 A * 10/1985 Brennan ............ A62B 35/0075 182/7
4,715,567 A * 12/1987 Poccard .................... B64C 9/16 74/519
5,146,655 A * 9/1992 Gibbs ...................... A62B 1/14 24/135 K
5,172,454 A * 12/1992 Martignago ......... A43C 11/148 24/71 SK
5,271,127 A * 12/1993 Christensen .......... B60P 7/0823 24/68 CD
5,316,103 A * 5/1994 Bell ......................... A62B 1/14 182/5
5,416,952 A * 5/1995 Dodge ................ A43C 11/146 24/68 A
5,577,576 A * 11/1996 Petzl ........................ A62B 1/14 188/65.4
5,593,009 A * 1/1997 King .................... A45C 7/0045 190/102
5,606,779 A * 3/1997 Lu ........................ A43C 11/146 24/68 SK
5,638,919 A * 6/1997 Pejout .................... A62B 35/04 182/5
5,661,877 A * 9/1997 Bloomer ................ A44B 11/12 24/309
5,745,959 A * 5/1998 Dodge ................... A63C 10/06 24/71 SK
5,745,963 A * 5/1998 Graziano ............. A43C 11/146 24/68 SK
5,762,401 A * 6/1998 Bernard ................. B60N 2/366 296/68.1
5,909,850 A * 6/1999 Cavasin ............. A43C 11/1413 24/71 SK
5,924,522 A * 7/1999 Ostrobrod ................ A62B 1/14 182/5
6,056,086 A * 5/2000 Gortan ..................... A62B 1/14 182/234
6,086,131 A * 7/2000 Bingle ..................... B60Q 3/30 296/76
6,175,994 B1 * 1/2001 Nicoletti ............ A43C 11/1413 24/71 SK
6,386,588 B1 * 5/2002 Young .................... A44B 11/12 280/821
6,665,913 B2 * 12/2003 Kosh ...................... A44B 11/12 24/191
6,748,630 B2 * 6/2004 Livingston ........... A43C 11/146 24/712.1
6,802,442 B1 * 10/2004 Thompson .............. A45F 3/047 224/259
6,843,346 B2 * 1/2005 LeBeau .................... A62B 1/14 182/5
6,868,587 B2 * 3/2005 Rard .................... A44B 11/125 24/191
7,086,122 B2 * 8/2006 Livingston ............. A63C 10/06 254/221
7,108,099 B2 * 9/2006 Ador ........................ A62B 1/14 182/5
7,131,675 B1 * 11/2006 Loucks ................. F24B 15/002 294/10
8,225,905 B2 * 7/2012 Delaittre .................. A62B 1/14 182/191
8,348,016 B2 * 1/2013 Lewis ...................... A62B 1/14 182/5
8,375,526 B2 * 2/2013 Everett .................... A62B 1/14 24/132 R
8,544,603 B1 * 10/2013 Rullo ..................... A62B 35/00 182/9
8,720,014 B2 * 5/2014 Chen .................. A62B 35/0056 24/132 R
9,155,359 B1 * 10/2015 Bailey .................. A44B 11/065
9,168,402 B2 * 10/2015 Casebolt .................. A62B 1/14
9,192,792 B2 * 11/2015 Moine ..................... A63B 29/02
9,266,462 B2 * 2/2016 Miller ..................... B60P 7/083
9,332,798 B2 * 5/2016 Gafforio ................ A42B 3/328
9,498,660 B2 * 11/2016 Moine ...................... A62B 1/14
9,622,547 B2 * 4/2017 Seader ................... A44B 11/12
9,636,528 B2 * 5/2017 Casebolt ................ A62B 35/04
9,874,034 B2 * 1/2018 Ostrobrod ............. F16D 63/008
9,884,209 B2 * 2/2018 Hwang .................... A62B 1/14
10,070,701 B1 * 9/2018 Liu ...................... A44B 11/125
10,648,536 B2 * 5/2020 Truesdell ............... A63B 27/00
2004/0075088 A1 * 4/2004 Rard ....................... B60P 7/083 254/199
2004/0103480 A1 * 6/2004 Carlson-Smith ....... A47G 21/00 7/112
2005/0115367 A1 * 6/2005 Williams ............ B25B 13/5058 81/151
2005/0205356 A1 * 9/2005 Velasco ............. A62B 35/0037 182/3
2007/0215411 A1 * 9/2007 Petzl ........................ A62B 1/14 182/5
2009/0188753 A1 * 7/2009 Liang ..................... A63B 27/00 182/133
2010/0078261 A1 * 4/2010 Watts ................ A62B 35/0006 182/9
2010/0089694 A1 * 4/2010 Paul ....................... A63B 27/00 182/9
2011/0048852 A1 * 3/2011 Wolf ........................ A62B 1/14 182/5
2011/0258815 A1 * 10/2011 Everette ................... A62B 1/14 24/134 R
2012/0005864 A1 * 1/2012 Chen .................. A62B 35/0081 24/132 WL
2012/0317761 A1 * 12/2012 Tardif ..................... F16B 45/02 24/599.5
2012/0317762 A1 * 12/2012 Tardif ..................... F16B 45/02 24/601.5
2013/0047388 A1 * 2/2013 Kavarsky ............... A63C 10/06 24/68 E
2013/0104354 A1 * 5/2013 Miller ..................... B60P 7/083 24/68 CD
2014/0020983 A1 * 1/2014 Casebolt ............ A62B 35/0081 182/241
2014/0026373 A1 * 1/2014 Seader ................... A44B 11/12 24/193
2014/0251725 A1 * 9/2014 Schurian ............ A62B 35/0037 24/633
2016/0213961 A1 * 7/2016 Anderson .......... A62B 35/0075
2016/0258457 A1 * 9/2016 Moine ..................... F16B 2/185
2016/0287914 A1 * 10/2016 Hwang ............. A62B 35/0068
2017/0050055 A1 * 2/2017 Spydell, Jr. .............. A62B 1/14
2017/0182928 A1 * 6/2017 Seader ................. A44B 11/125
2017/0205012 A1 * 7/2017 Nyfelt ..................... F16L 39/00
2019/0224503 A1 * 7/2019 Malcolm .................. A62B 1/14
2019/0314651 A1 * 10/2019 Chabod .................... A62B 1/14

* cited by examiner

CAM ASSEMBLY FOR USE WITH POLE CLIMBING FALL RESTRICTION DEVICE

REFERENCE TO RELATED APPLICATION

The present application is a continuation of U.S. application Ser. No. 15/137,079, filed Apr. 25, 2016 which claimed priority to U.S. Provisional Application Ser. No. 62/152,085, filed Apr. 24, 2015, the entirety of which is hereby incorporated by reference.

BACKGROUND

1. Field of Invention

The present invention relates generally to pole climbing equipment, and more particular to assemblies that assist in preventing a person from falling while ascending or descending a pole.

2. Background of Art

Pole fall restriction devices are well known in the art. The assemblies typically comprise a pole strap that is adapted to wrap around the pole, a front strap or lanyard that connects to both the pole strap and the user's body harness and wraps around the front of the pole nearest the user, and adjustment hardware for adjusting the effective length of the pole strap and lanyard. When a user begins ascending or descending a pole, he or she will grab a hold of the pole strap near one end, while making any necessary adjustments to the effective length of the straps with the other hand. When actually ascending or descending, the user will hold the ends of the pole strap and move it up or down while hitchhiking up or down the pole.

To adjust the length of the pole strap wrapped around the pole, the climber manipulates a spring-biased cam. When in its neutral condition, the cam securely grips and retains the webbing from which the pole strap is composed. To alter the effective length of the pole strap, the climber must manually overcome the spring-bias of the cam such that it no longer engages the webbing, thereby permitting the webbing to slide freely through the cam. Once the desired alteration to the effective length of the webbing is achieved, the climber can release the cam thus permitting the bias of the spring to forcibly close the cam into securely engaged relation with the webbing.

While the spring biased cam is an effective tool for adjusting the pole strap, its manipulation by a climber is not easy. The climber is suspended above the ground, supported only by a harness and the fall prevention assembly. While having to hold the pole strap with one hand, the other hand is then used to overcome the spring bias and then slide the pole strap to the desired position. The simultaneous manipulation of several items, while suspended and balancing oneself relative to a pole requires ample training and skill.

3. Objects and Advantages

It is therefore a principal object and advantage of the present invention to provide a cam assembly that includes levers to assist the climber in overcoming the spring bias and adjust the pole strap.

Other objects and advantages will in part be obvious and in part appear hereinafter.

SUMMARY OF THE INVENTION

In accordance with the foregoing object and advantage, one aspect of the present invention provides a cam assembly for use with a pole climbing fall prevention assembly. The pole climbing fall prevention assembly comprises a pole strap and a lanyard. The cam assembly comprises a body having a base and opposing sidewalls; a cam pivotally connected to the body; a spring attached to the cam and producing a bias force thereto relative to the body; and a lever attached to one of the opposing sidewalls. A connector interconnects the cam assembly to the lanyard.

In another aspect of the invention a second lever is attached to the other of the opposing sidewalls.

In another aspect of the invention, the first and second levers are coated or covered with a non-slip material.

In another aspect of the invention, the non-slip material is preferably brightly colored so as to serve as a source of visual distinction making it easier to see and grab.

In another aspect of the invention directional indicators are applied to/printed upon either or both of the first and second levers.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
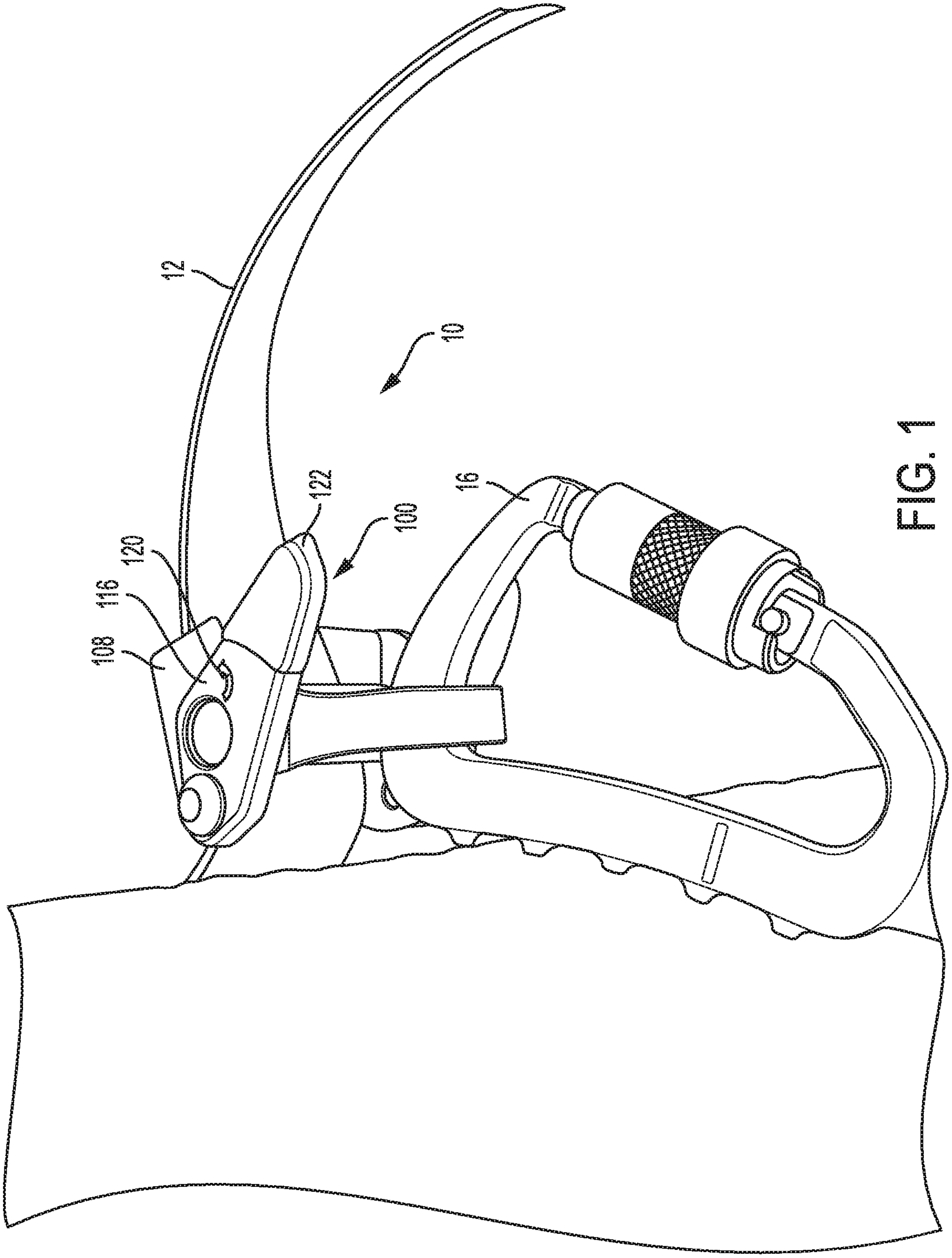
FIG. 1 is close-up perspective view of an embodiment of the present invention in use with a pole strap and lanyard connecting carabineer.
Figure 2:
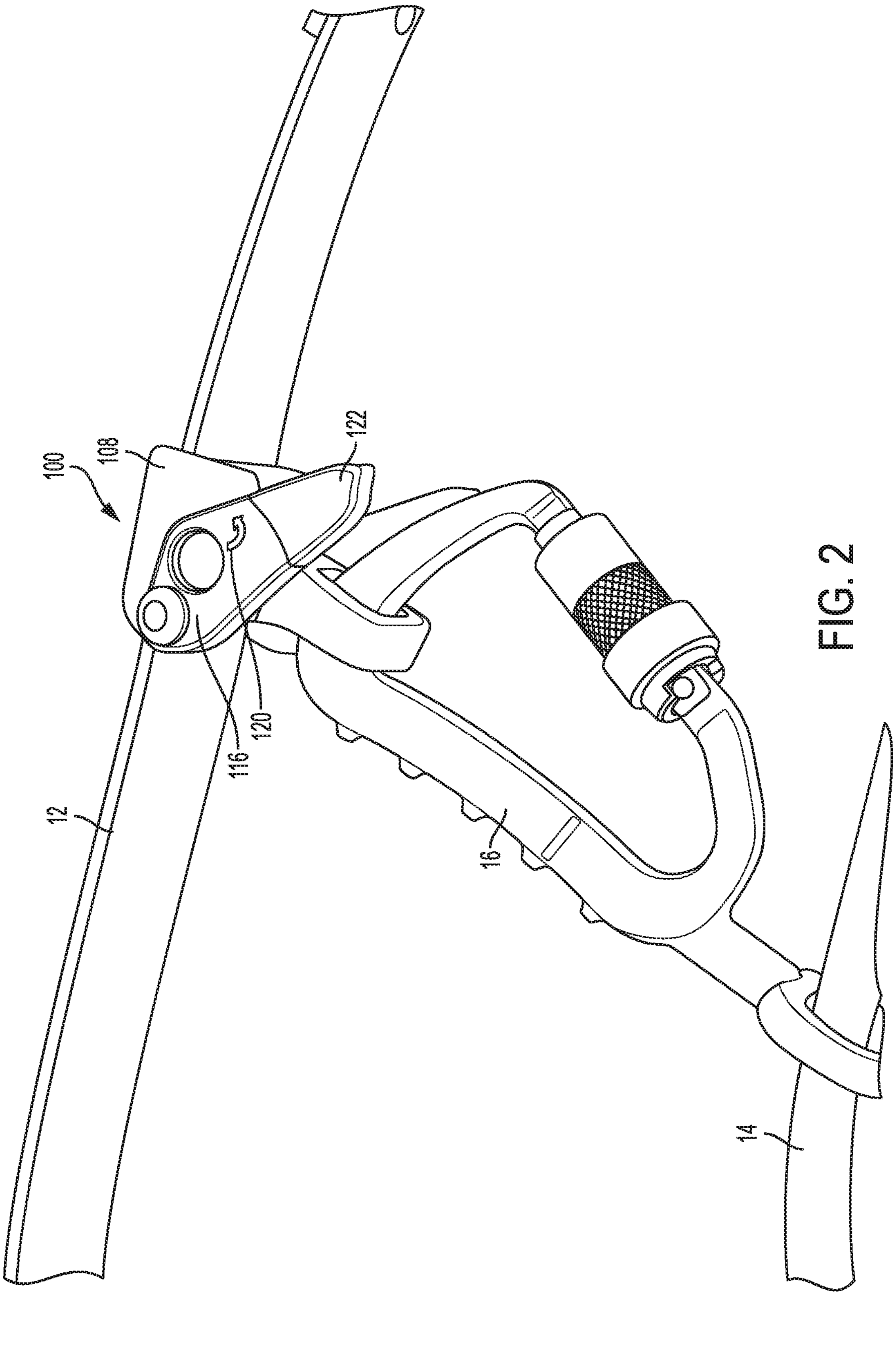
FIG. 2 is a top plan view of an embodiment of the present invention assembled with a pole strap and lanyard connecting carabineer.
Figure 3:
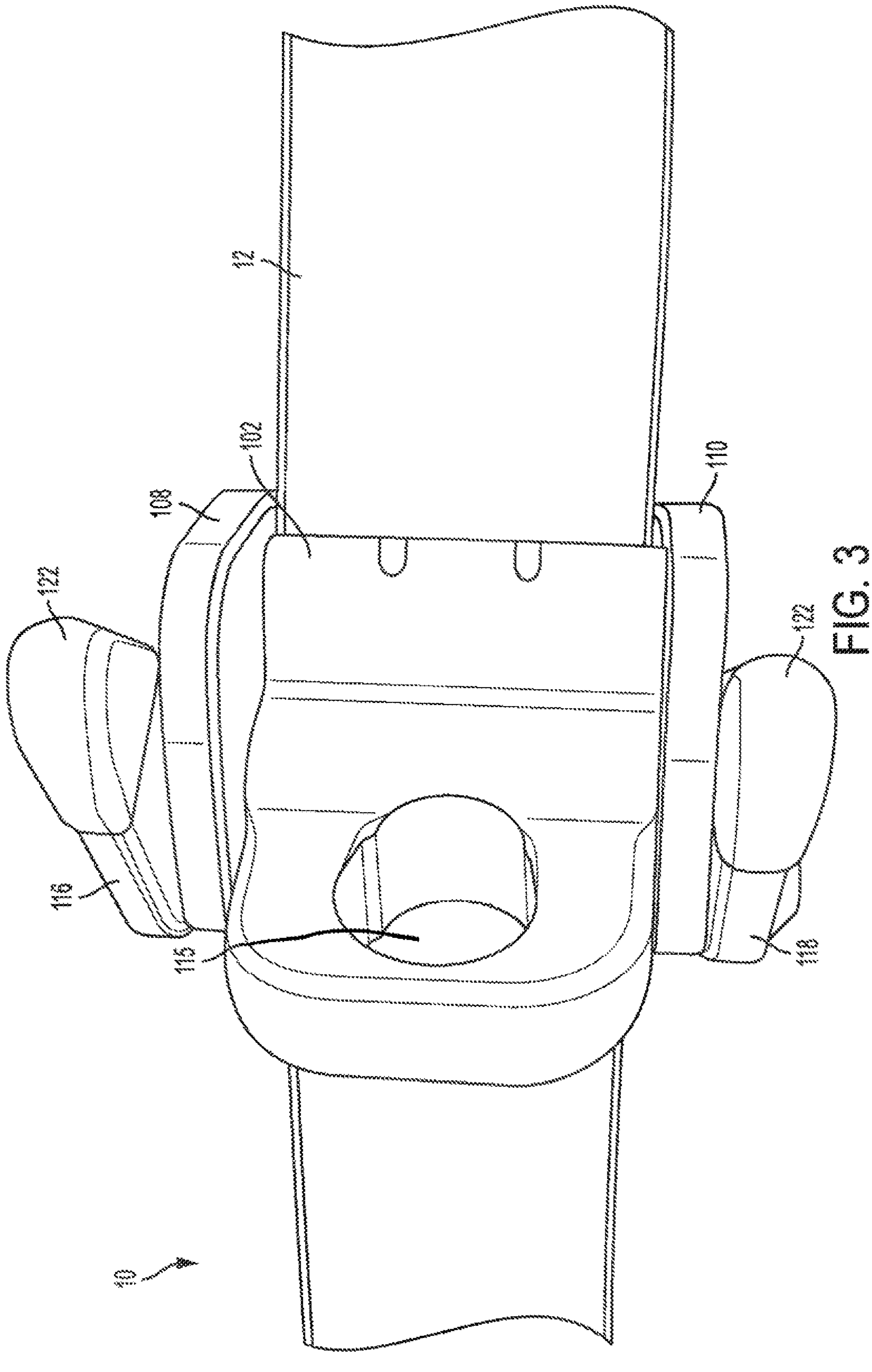
FIG. 3 is a top plan view of an embodiment of the present invention assembled on a pole strap.

Referring now to the drawings, in which like reference numerals refer to like parts throughout, there is seen in FIG. 1 a pole climbing fall prevention assembly designated generally by reference numeral 10, comprising a pole strap 12, a lanyard 14 (see FIG. 2), a cam assembly, designated generally by reference numeral 100, through which pole strap 12 passes and is connected, and a connector (e.g., carabineer) 16 interconnecting cam assembly 100 to lanyard 14. Pole strap 12 is composed of a length of webbing (made of nylon, leather or other pliable but durable material).

Figure 4:
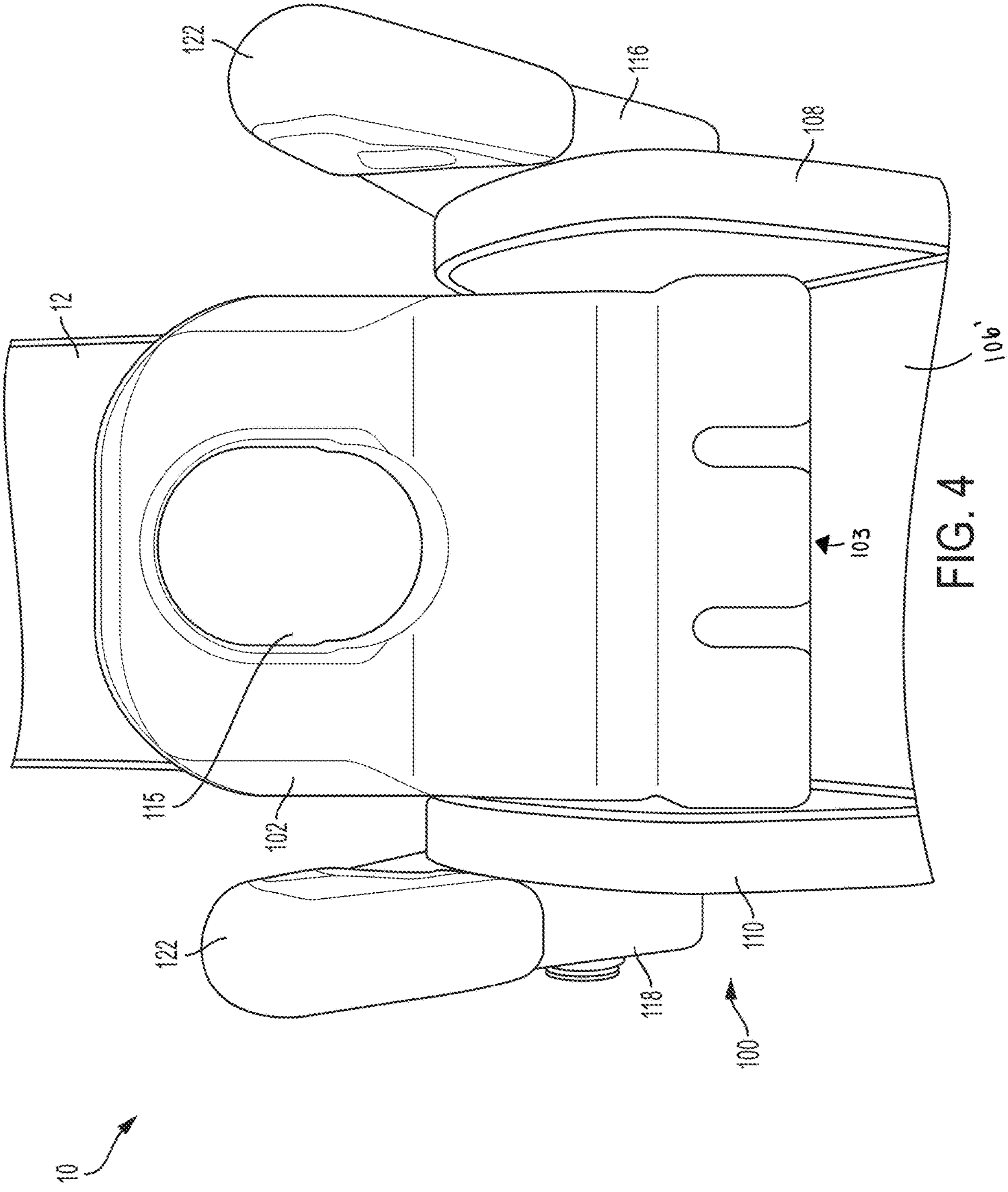
FIG. 4 is a front elevation view of an embodiment of the present invention assembled on a pole strap.
Figure 5:
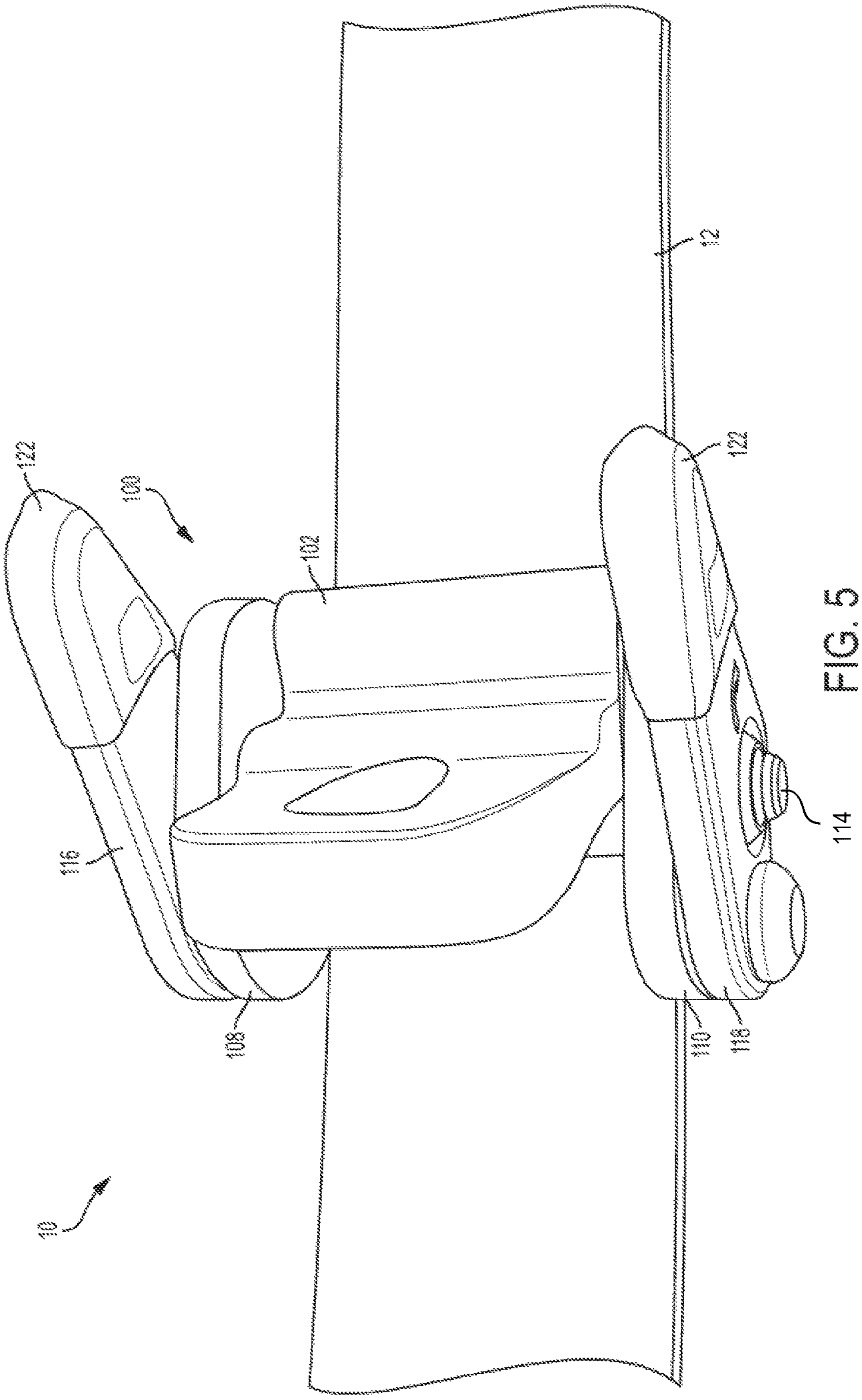
FIG. 5 is another top plan view of an embodiment of the present invention assembled on a pole strap.
Figure 6:
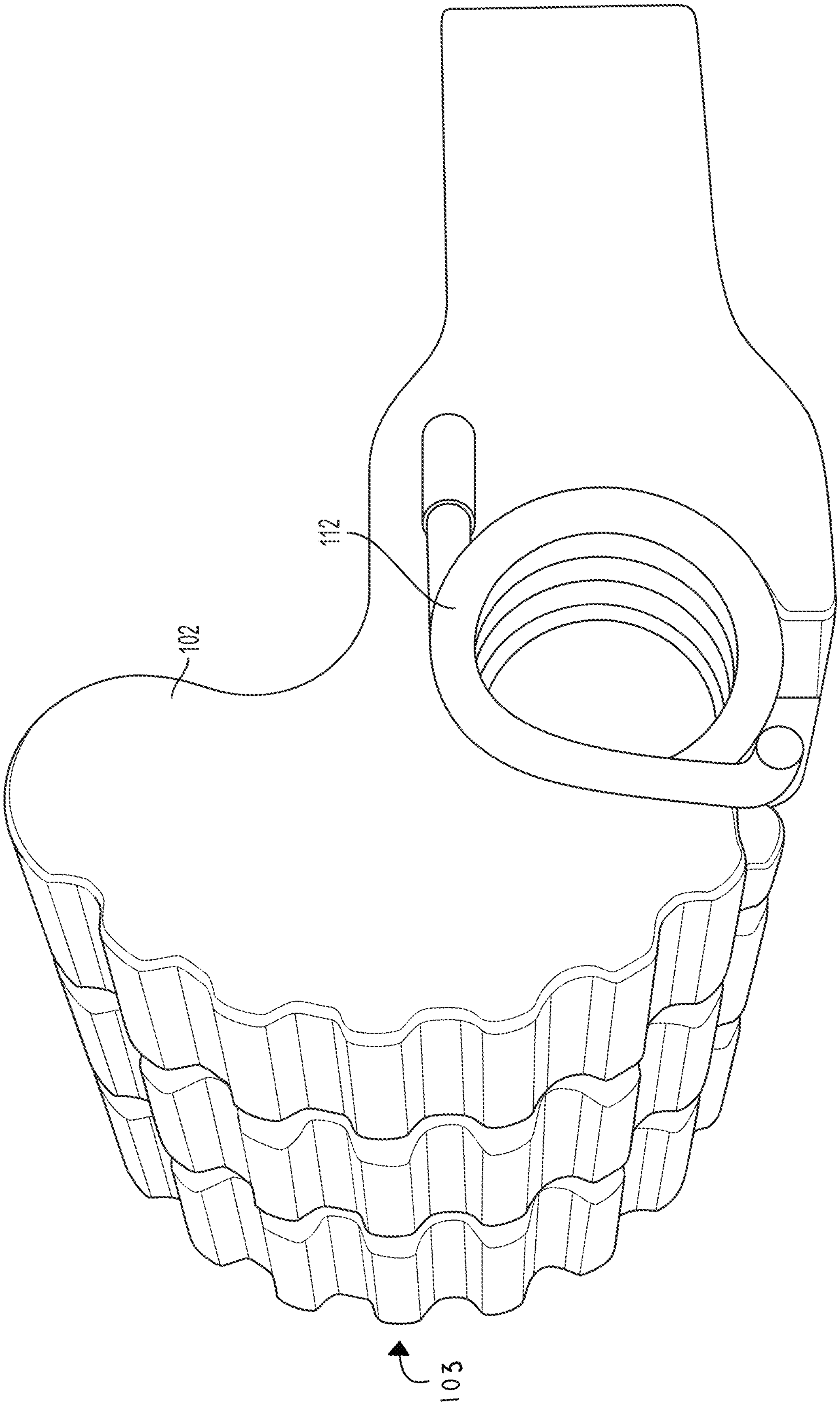
FIG. 6 is a perspective view of a spring and cam assembly.
Figure 7:
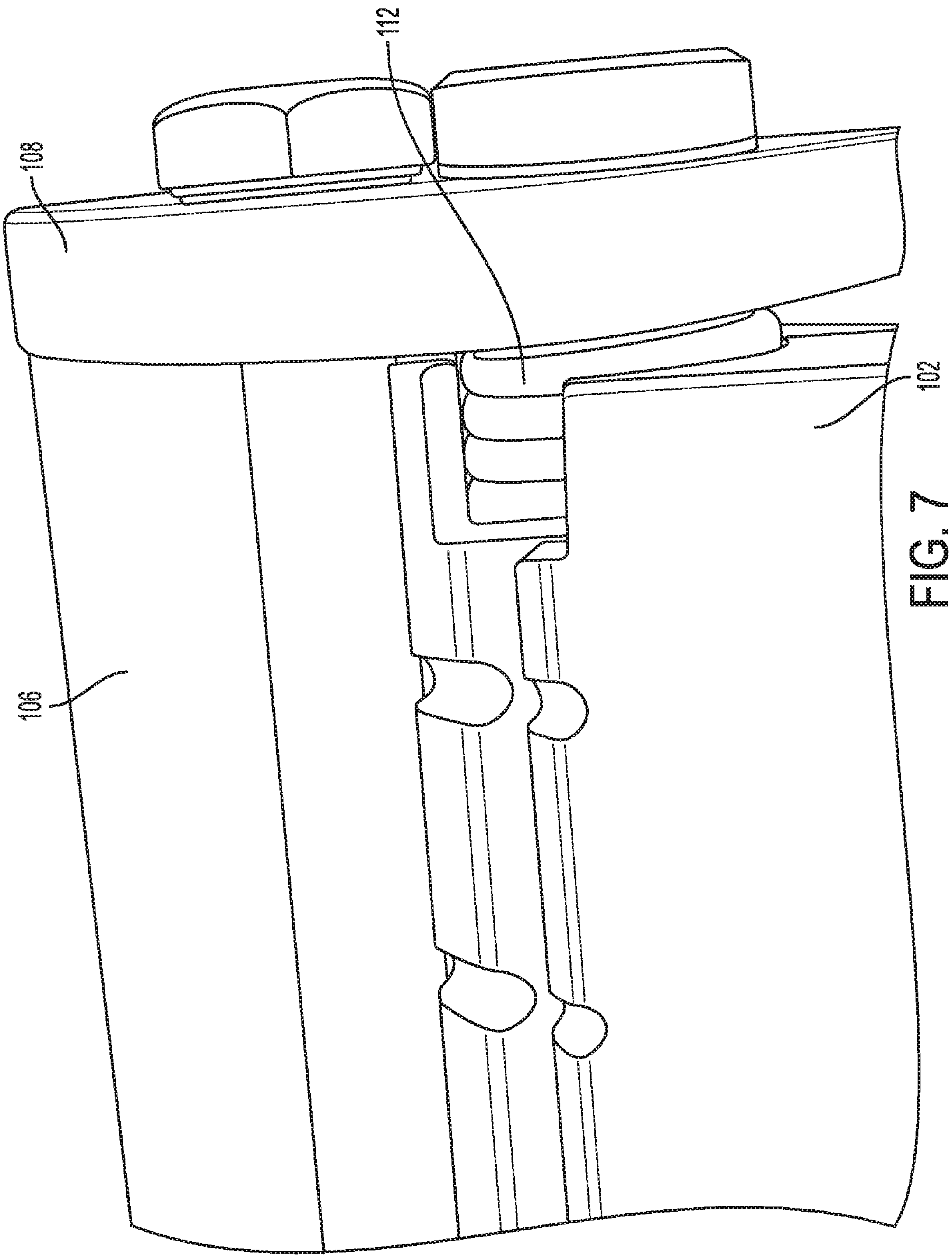
FIG. 7 is a perspective view of a spring and cam assembled with the body of the cam assembly.

Cam assembly 100 will be referred to hereinafter as a "web grab" as that is indicative of the function it serves (i.e., grabbing a web of material). Web grab 100 comprises a cam 102 having a grasping surface 103 (see, e.g., FIGS. 4 and 6) and is pivotally connected to a base 106 having a top surface 106', and a pair of opposed sidewalls 108/110 formed on opposite sides of base 106. Cam 102 connects to base 106 by a spring 112 that is coiled within cam 102 and bolt 114 that passes through sidewall 108 and spring 112 and serves as the pivot axis for cam 102 relative to housing 104. Spring 112 naturally biases cam 102 into engaged relation with base 106; in order to separate cam 102 from base 106, thereby creating a space through which pole strap 12 can pass, one must manually overcome the spring force and pivot cam 102 away from base 106. Once the manually applied force is removed, spring 112 will bias cam 102 back into engaged relation with base 106—or pole strap 12 (assuming it is passed between cam 102 and base 106). When pole strap 12 is passed between cam 102 and base 106, cam 102 will secure the positioning of pole strap 102 in place until the bias of spring 112 is manually overcome, thereby permitting the pole strap to be moved/adjusted relative to web grab 100.

Web grab 100 is connected to lanyard 14 by connector 16. Connector 16 is removably attached to cam 102 by passing the leg of connector 16 through an eyelet 115 formed through cam 102. Connector 16 also includes an eye 18 through which lanyard 14 passes. The weight of a climber to whom the lanyard 14 is tethered creates a pulling force that causes cam 102 to remain securely engaged with pole strap 12. To adjust pole strap 12 the climber must permit some slack to be formed in lanyard 16.

To assist a climber with overcoming the spring bias, web grab 100 further comprises a pair of levers 116/118 securely attached to sidewalls 108/110, respectively, by bolts or other conventional fastening means. A directional indicator 120 is printed on levers 116/118 to assist the climber in immediately knowing which way to move the lever in order to overcome the spring bias and cause separation between cam 102 and pole strap 12. Web grab 100 could be equipped with only a single lever instead of two, but providing the two levers permits either side of the web grab 100 to be accessed depending on the orientation of web grab 100 relative to the climber. Levers 116/118 extend outwardly away from web grab 100 to provide a moment arm that minimizes the amount of force needed to be applied to the lever in order to overcome the spring bias. In addition, a non-slip, brightly colored covering 122 is applied over the ends of levers 116/118 to make it both more comfortable and easier for the climber to see and use.

What is claimed is:

1. A cam assembly for use with a pole climbing fall restriction device that comprises a pole strap and a lanyard, said cam assembly comprising:

a) a body having a base, a first sidewall, and a second sidewall, the first sidewall and the second sidewall each extending directly from said base in a same direction, wherein such that the first sidewall opposes the second sidewall, and the base includes a top surface located between the first sidewall and the second sidewall;

b) a cam pivotally connected to said body such that the cam is pivotable with respect to the first sidewall between a first position and a second position, wherein a grasping surface of the cam is nearer to the top surface of the base in the first position than in the second position, wherein when the pole strap is positioned between the cam and the base and a force acts on the pole strap in a direction parallel to the top surface of the base, the cam is drawn toward the first position, such that the grasping surface compresses the strap between the grasping surface and the top surface of the base, to grasp and restrain the pole strap;

c) an elongated spring attached to said cam and producing a bias force thereto relative to said body, to bias the cam in the first position, a major length of said spring extending along a longitudinal axis extending from said first sidewall to said second sidewall; and d) a first lever securely attached to and positioned on an outside surface of said first sidewall such that, during use, operation of the first lever pivots the cam with respect to the first sidewall, toward the second position, to overcome the bias force of the spring.

2. The cam assembly according to claim 1, further comprising a second lever attached to and positioned on said second sidewall such that, during use, operation of the second lever pivots the cam with respect to the second sidewall, toward the second position, to overcome the bias force of the spring.

3. The cam assembly according to claim 2, further comprising first and second nonslip coverings positioned over said first and second levers, respectively.

4. The cam assembly according to claim 3, wherein each of said first and second non-slip coverings are brightly colored to provide a source of visual distinction.

5. The cam assembly according to claim 2, further comprising a directional indicator applied to at least one of said first lever or second lever or combinations thereof.

6. The cam assembly according to claim 1, further comprising a first non-slip covering positioned over said first lever.

7. The cam assembly according to claim 6, wherein said first non-slip covering is brightly colored to provide a source of visual distinction.

8. The cam assembly according to claim 1, further comprising a directional indicator applied to said first lever.

9. The cam assembly according to claim 1, wherein said spring is coiled within said cam.

10. A pole fall restriction assembly, comprising:

a) an elongated pole strap; and b) a cam assembly, comprising:

i) a body having a base, a first sidewall, and a second sidewall, the first sidewall and the second sidewall each extending directly from said base in a same direction, wherein such that the first sidewall opposes the second sidewall, and the base includes a top surface located between the first sidewall and the second sidewall;

ii) a cam pivotally connected to said body such that the cam is pivotable with respect to the first sidewall between a first position and a second position, wherein a grasping surface of the cam is nearer to the top surface of the base in the first position than in the second position, wherein when the pole strap is positioned between the cam and the base and a force acts on the strap in a direction parallel to the top surface of the base, the cam is drawn toward the first position, such that the grasping surface compresses the pole strap between the grasping surface and the top surface of the base to grasp and restrain the pole strap, and wherein said cam further comprises an eyelet formed therethrough;

iii) a spring attached to said cam and producing a bias force thereto relative to said body, to bias the cam in the first position, said spring extending in a direction from said first sidewall to said second sidewall;

iv) an elongated lanyard interconnected to said cam assembly by a connector, wherein said connector passes through said eyelet of said cam;

v) a first lever attached to said first sidewall, wherein said first lever is separate from said cam and is configured to assist in overcoming said bias force; and vi) wherein said first lever is securely attached to and positioned on an outside surface of said first sidewall such that, during use, operation of the first lever pivots the cam with respect to the first sidewall, toward the second position, to overcome the bias force of the spring.

11. The pole fall restriction assembly of claim 10, wherein said cam assembly further comprises a second lever attached to and positioned on said second sidewall such that, during use, operation of the second lever pivots the cam with respect to the second sidewall, toward the second position, to overcome the bias force of the spring.

12. The pole fall restriction assembly of claim 11, further comprising first and second non-slip coverings positioned over said first and second levers, respectively.

13. The pole fall restriction assembly of claim 12, wherein each of said first and second non-slip coverings are brightly colored to provide a source of visual distinction.

14. The pole fall restriction assembly of claim 11, further comprising a directional indicator applied to at least one of said first lever or said second lever or combinations thereof.

15. The pole fall restriction assembly of claim 10, further comprising a first nonslip covering positioned over said first lever.

16. The pole fall restriction assembly of claim 15, wherein said first non-slip covering is brightly colored to provide a source of visual distinction.

17. The pole fall restriction assembly of claim 10, further comprising a directional indicator applied to said first lever.

* * * * *